US008620086B2

(12) United States Patent
Lam et al.

(10) Patent No.: US 8,620,086 B2
(45) Date of Patent: Dec. 31, 2013

(54) SYSTEM AND METHOD FOR IMAGE REGISTRATION BASED ON VARIABLE REGION OF INTEREST

(75) Inventors: Eric P. Lam, Diamond Bar, CA (US); Christopher A. Leddy, Hunington Beach, CA (US); Harrison A. Parks, Los Angeles, CA (US); Stephen R. Nash, Playa Del Ray, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/369,914

(22) Filed: Feb. 9, 2012

(65) Prior Publication Data

US 2012/0134592 A1 May 31, 2012

Related U.S. Application Data

(62) Division of application No. 11/707,800, filed on Feb. 16, 2007, now Pat. No. 8,160,364.

(51) Int. Cl.
*G06K 9/46* (2006.01)
*G06K 9/66* (2006.01)

(52) U.S. Cl.
USPC .......................... 382/190; 348/135; 348/159

(58) Field of Classification Search
USPC .......... 348/135, 142, 159; 382/128, 133, 143, 382/173, 190, 294, 300
See application file for complete search history.

(56) References Cited

U.S. PATENT DOCUMENTS

| 6,324,299 | B1 * | 11/2001 | Sarachik et al. ............. 382/151 |
| 6,405,153 | B1 * | 6/2002 | Fiekowsky .................... 702/172 |
| 6,973,207 | B1 * | 12/2005 | Akopyan et al. ............. 382/143 |
| 7,046,860 | B2 * | 5/2006 | Soubelet et al. ............. 382/294 |
| 7,239,929 | B2 * | 7/2007 | Ulrich et al. .................... 700/98 |
| 7,529,427 | B2 * | 5/2009 | Schweng ...................... 382/282 |
| 7,792,372 | B2 * | 9/2010 | Ryu ............................. 382/232 |
| 7,796,815 | B2 * | 9/2010 | Muschler et al. ............. 382/173 |
| 7,853,063 | B2 * | 12/2010 | Barski et al. .................. 382/132 |
| 8,102,423 | B2 * | 1/2012 | Cheng ........................... 348/159 |
| 2002/0118874 | A1 * | 8/2002 | Chung et al. ................. 382/154 |
| 2004/0085443 | A1 * | 5/2004 | Kallioniemi et al. ......... 348/135 |

(Continued)

OTHER PUBLICATIONS

Althof, R., et al., "A Rapid and Automatic Image Registration Algorithm with Subpixel Accuracy" IEEE Transactions on Medical Imaging, vol. 16, No. 3, pp. 308-316, Jun. 1997.

(Continued)

*Primary Examiner* — Gregory M Desire
(74) *Attorney, Agent, or Firm* — Pierce Atwood LLP; Joseph M. Maraia

(57) ABSTRACT

An image registration system for aligning first and second images. The novel system includes a first system for extracting a region of interest (ROI) from each image and a second system for coarsely aligning the regions of interest. The first system determines the size and location of the ROI based on the number of features contained within the region. The size of the ROI is enlarged until a number of features contained in the ROI is larger than a predetermined lower bound or until the size is greater than a predetermined upper bound. The second system computes a cross-correlation on the regions of interest using a plurality of transforms to find a coarse alignment transform having a highest correlation. The image registration system may also include a third system for performing sub-pixel alignment on the regions of interest.

14 Claims, 7 Drawing Sheets

(56) References Cited

U.S. PATENT DOCUMENTS

2004/0170316 A1* 9/2004 Saquib et al. ............... 382/162
2006/0115184 A1* 6/2006 Michel ........................ 382/299
2007/0237241 A1* 10/2007 Ha et al. ................. 375/240.27
2007/0248268 A1* 10/2007 Wood .......................... 382/195
2008/0031506 A1* 2/2008 Agatheeswaran et al. .... 382/132

OTHER PUBLICATIONS

Dai, X., et al., "A Feature-Based Image Registration Algorithm Using Improved Chain-Code Representation Combined with Invariant Moments" IEEE Transactions on Geoscience and Remote Sensing, vol. 37, No. 5, pp. 2351-2362, Sep. 1999.

* cited by examiner

SYSTEM AND METHOD FOR IMAGE REGISTRATION BASED ON VARIABLE REGION OF INTEREST

CROSS-REFERENCE TO RELATED APPLICATIONS

This application is a divisional of U.S. application Ser. No. 11/707,800 filed Feb. 16, 2007, the contents of which is incorporated herein in its entirety.

BACKGROUND OF THE INVENTION

The present invention relates to image processing systems. More specifically, the present invention relates to systems and methods for image registration.

In applications such as remote sensing, medical imaging, and computer vision, multiple images of a scene or object are acquired at different times or from different perspectives. These images will typically be in different coordinate systems. Image registration is the process of transforming the images such that they are all in one coordinate system, allowing for the comparison or integration of data from the different images. The transformation used may include translation, rotation, scaling, or other more complicated transforms.

In general, image registration can be performed by trying different transforms on the target image (for example, translating the image using several different shifts), computing a correlation metric for each transform, and selecting and applying the transform having the highest correlation. This process, however, can become computationally expensive as the size of the image increases. The problem is even greater when sub-pixel registration is required (i.e., using image shifts of a fraction of a pixel).

A commonly used solution is the Fitts' algorithm, which uses a gradient-based approach to perform sub-pixel image registration. Gradient-based approaches are typically less computationally expensive than correlation approaches, but can be less accurate. The Fitts' algorithm is typically only accurate to within one pixel. As is known in the art, its performance is typically unsatisfactory for images having shifts of more than one pixel. Applying low pass filtering followed by downsampling prior to applying the Fitts' algorithm does not always yield satisfactory results. Low pass filtering and downsampling increases the dynamic range at the expense of precision. This low pass filtering and downsampling approach is limited by the amount of detail in the image. It is possible to remove valuable information with this approach and, from experimentation, it does not necessarily result in the correct image shift.

Hence, a need exists in the art for an improved system or method for sub-pixel image registration offering greater accuracy and shorter computation time than prior approaches.

SUMMARY OF THE INVENTION

The need in the art is addressed by the image registration system for aligning a first image and a second image of the present invention. The novel image registration system includes a first system for extracting a region of interest (ROI) from each image and a second system for coarsely aligning the regions of interest. The first system determines the size and location of the ROI based on the number of features (such as edges) contained within the region. The size of the ROI is enlarged until a number of features contained in the ROI is larger than a predetermined lower bound or until the size is greater than a predetermined upper bound. The second system computes a cross-correlation on the regions of interest using a plurality of transforms to find a coarse alignment transform having a highest correlation. The image registration system may also include a third system for performing sub-pixel alignment on the regions of interest. The third system interpolates the regions of interest and performs a cross-correlation on the interpolated regions of interest using a plurality of transforms to find a sub-pixel alignment transform having a highest correlation. The coarse alignment and sub-pixel alignment transforms can then be applied to one (or both) of the original input images to align them.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
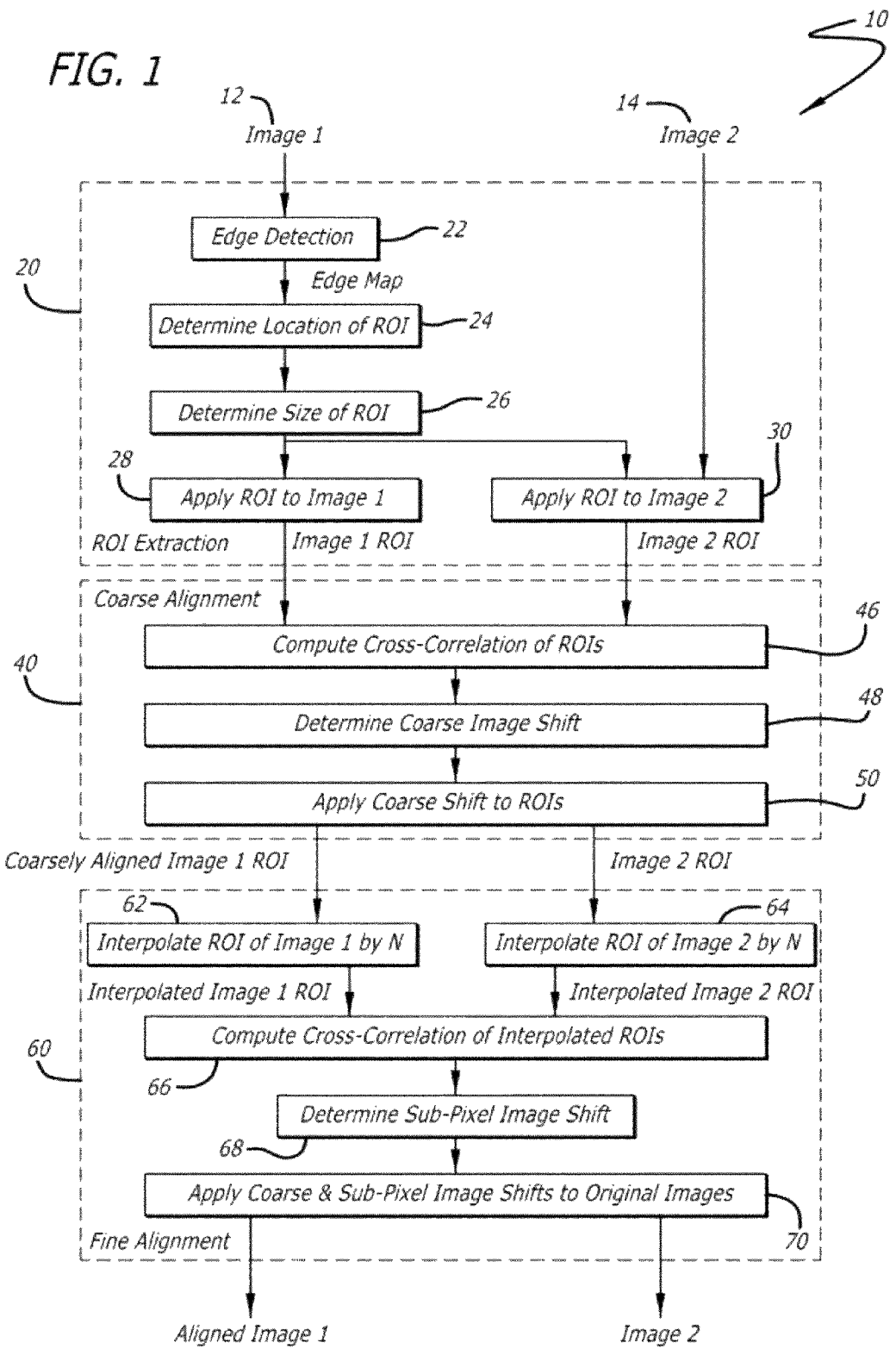
FIG. 1 is a simplified block diagram of an image registration system designed in accordance with an illustrative embodiment of the present invention.

FIG. 1 is a simplified block diagram of an image registration system 10 designed in accordance with an illustrative embodiment of the present invention. The image registration system 10 is adapted to process two images, a first image 12 and a second image 14. In the illustrative embodiment, the two images are misaligned by an unknown shift $\Delta_x$ in the horizontal direction and an unknown shift $\Delta_y$ in the vertical direction (i.e., the illustrative image registration system uses a translation transformation model). The teachings of the present invention, however, may be adapted for use with different types of transformation models such as rotation, scaling, shearing, etc.

The image registration system 10 of the present invention reduces computation time by performing correlation processing on small sub-areas of the images, instead of on the entire images. The image registration system 10 includes a novel system 20 for extracting a "region of interest" (ROI) from each image. The location and size of the ROI are the same for both images, and are based on the amount of features contained in the ROI. In the illustrative embodiment, features are chosen to be edge (boundary) pixels, because it may be easier to correlate coarsely with edges than with smoother features. The teachings of the present invention, however, may be adapted to use other features such as curves, line intersections, high frequency components, etc. The size of the ROI is variable, depending on the number of features it contains. If an ROI does not contain enough features, it is enlarged. The growth of the ROI is stopped once it contains enough edge pixels to perform an accurate image registration. Other metrics may also be used to determine the size and location of the ROI.

After the ROI is found, a coarse alignment system 40 aligns the ROIs of the two images to within one pixel. The coarse alignment system 40 performs cross-correlation on the ROIs of the two images. Because the region of interest is smaller than the entire image, cross-correlation can be performed much faster than performing cross-correlation on the entire image. The image shift (including a shift $s_x$ in the horizontal direction and a shift $s_y$ in the vertical direction) corresponding to the highest correlation is noted. This shift is then used to coarsely align the two ROIs.

After the two ROIs are coarsely aligned, a fine alignment system 60 finds the sub-pixel shift between the images. The fine alignment system 60 interpolates the two ROIs and performs cross-correlation on the interpolated ROIs. The shift ($p_x$ in the horizontal direction and $p_y$ in the vertical direction) corresponding to the highest correlation is chosen as the sub-pixel shift of the images. The coarse and sub-pixel shifts can then be applied to the original images to align them.

As shown in FIG. 1, the ROI extraction system 20 is adapted to perform the following steps: detecting features (Step 22), determining the location of the ROI (Step 24), determining the size of the ROI (Step 26), and applying the ROI to the first image (Step 28) and second image (Step 30). In the illustrative embodiment, the feature detecting step 22 uses an edge detection algorithm to extract an edge map from one of the images.

Figure 2:
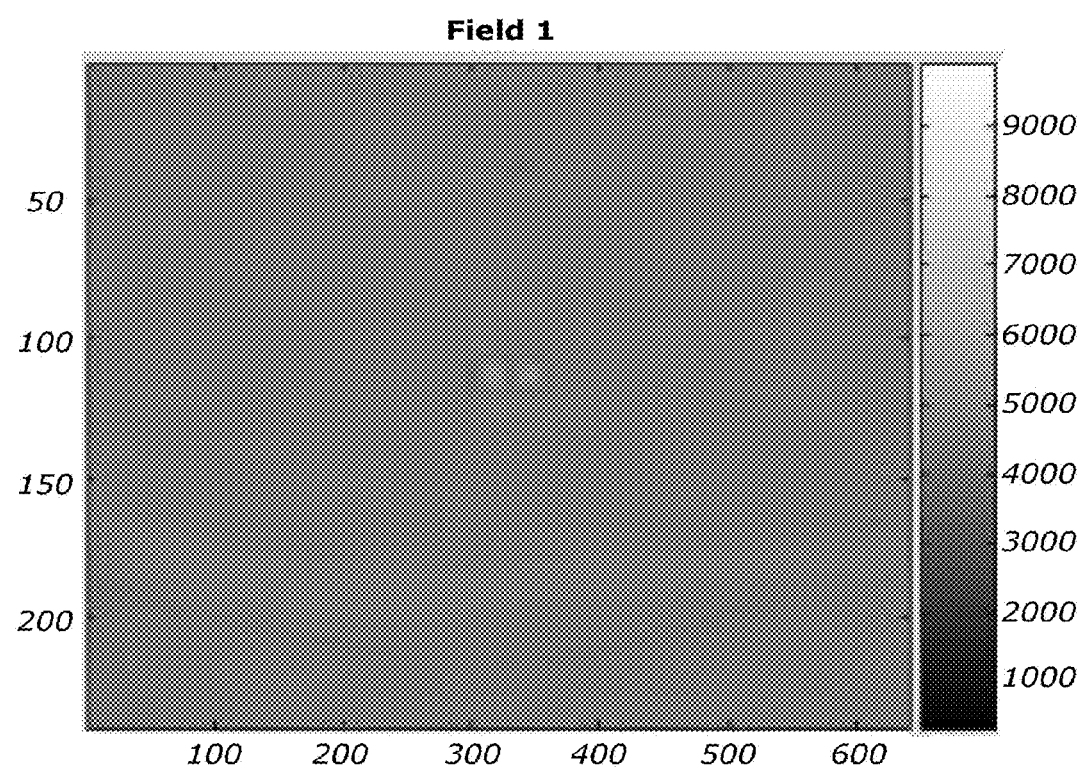
FIG. 2 shows a sample image.
Figure 3:
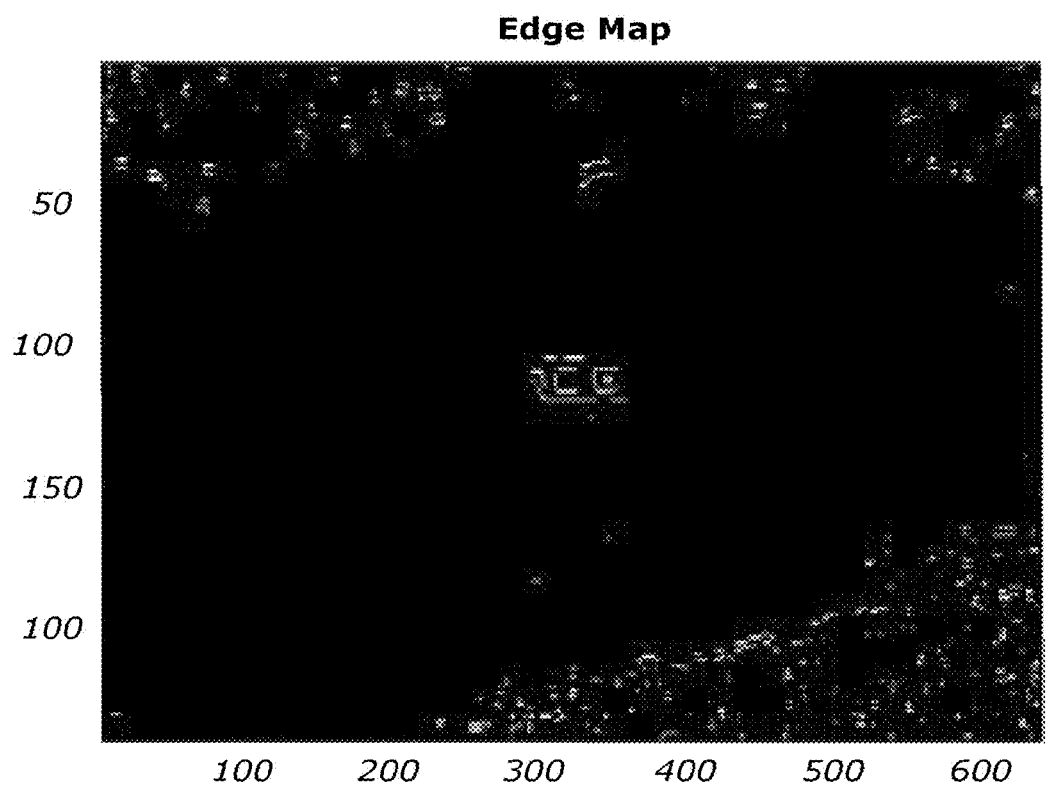
FIG. 3 shows an illustrative edge map corresponding to the sample image of FIG. 2.

FIG. 2 shows a sample image having dimensions of 640× 240 pixels, and FIG. 3 shows an illustrative edge map corresponding to the sample image of FIG. 2. White pixels in the edge map represent edge pixels. Any suitable edge detection (or other feature detection) algorithm can be used to generate the edge map. The edge map is subsequently used by Steps 24 and 26 to determine the location and size, respectively, of the ROI.

In the sample image of FIG. 2, there is a lack of image detail in the majority of the image and features are located primarily in the center of the image. In many remote sensing or tracking applications, the imaging sensors are automatically or manually pointed towards a target object, such that the object is always at or near the center of the image. For these applications, at Step 24, the location of the ROI is simply chosen to be at the center of the image.

Figure 4:
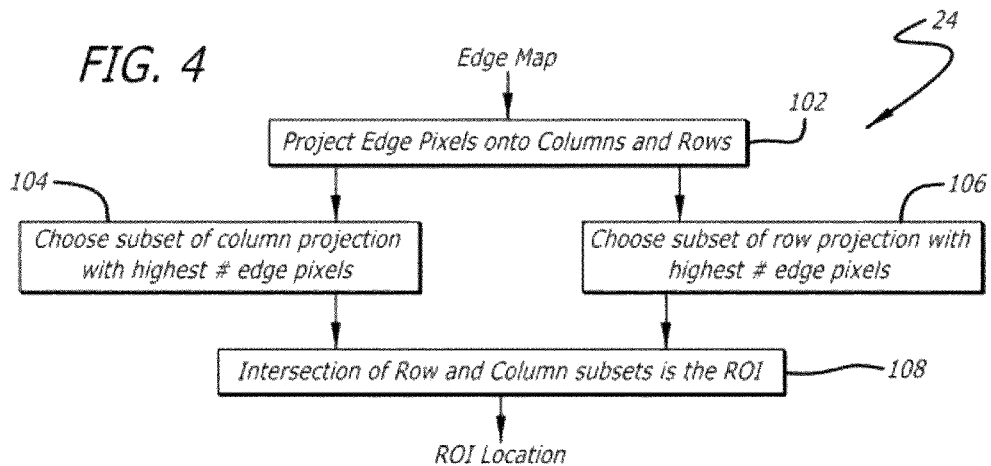
FIG. 4 is a simplified flow diagram of an algorithm for locating a region of interest (ROI) designed in accordance with an illustrative embodiment of the present invention.
Figure 5A:
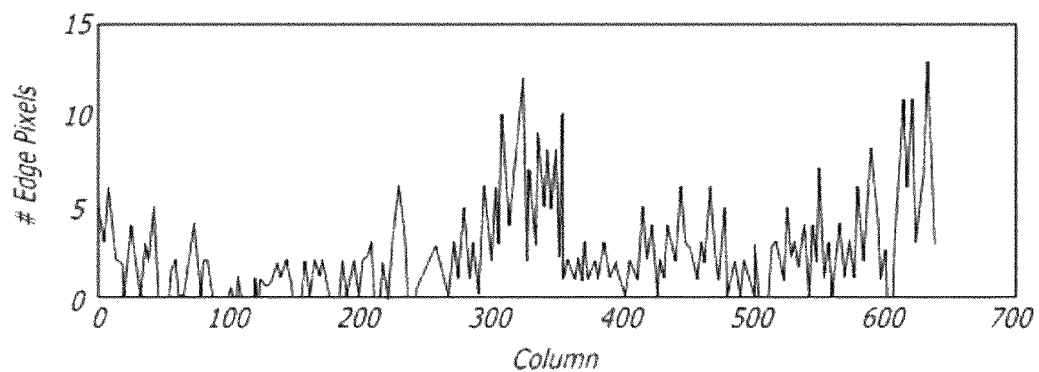
FIG. 5a is a graph of an illustrative column projection showing the number of edge pixels in each column of the sample image of FIG. 2.
Figure 5B:
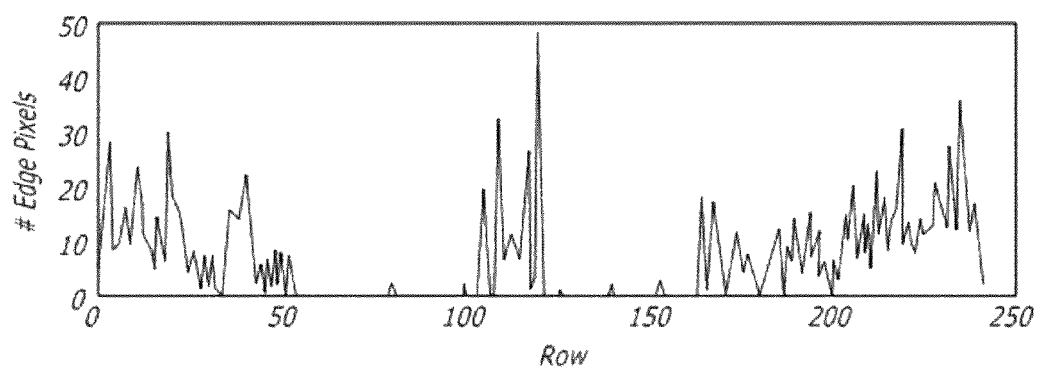
FIG. 5b is a graph of an illustrative row projection showing the number of edge pixels in each row of the sample image of FIG. 2.

Alternatively, for applications where the features are not always concentrated at the center of the image, FIG. 4 shows a simplified flow diagram of an algorithm 24 for determining the location of an ROI designed in accordance with an illustrative embodiment of the present invention. The illustrative algorithm 24 uses histograms of the edge pixels to find a region in the image containing a high number of features. First, at Step 102, project the edge pixels from the edge map into columns and rows (similar to a histogram projection) to obtain counts of the number of edge pixels in each column and in each row. FIG. 5a is a graph of an illustrative column projection showing the number of edge pixels in each column of the sample image of FIG. 2, and FIG. 5b is a graph of an illustrative row projection showing the number of edge pixels in each row.

Next, select an ROI location based on the edge projections, where projections have the highest number of edge pixels. In the illustrative embodiment of FIG. 4, at Step 104, find a subset in the column projection having the highest number of edge pixels and, at Step 106, find a subset in the row projection having the highest number of edge pixels. A suitable size for the subset can be chosen depending on the application and the image size. For a 640×240 pixel image, the subset size may be chosen to be, for example, 20. From the column projection, count the total number of edge pixels in each 20 column subset and select the subset containing the largest total number of edge pixels. Similarly, for the row projection, count the total number of edge pixels in each 20 row subset and select the subset containing the largest total number of edge pixels. In order to reduce computation time, each subset can be shifted by some predetermined amount (say, for example, by five pixels), instead of trying every single subset. For example, the first subset would include columns 1 through 20, the second subset would include columns 6 through 25, the third subset would include columns 11 through 30, etc.

In the example of FIG. 5a, the subset including columns 321 to 340 contain the highest total number of edge pixels. From FIG. 5b, the subset including rows 101 to 120 contain the highest total number of edge pixels. At Step 108, the location of the ROI is chosen as the intersection of theses row and column subsets.

The illustrative algorithm shown in FIG. 4 is one way to determine the location of the ROI. As discussed above, an alternate approach is to have a fixed location, such as at the center of the image. Other methods for determining the location of the ROI can also be used without departing from the scope of the present teachings.

After the location of the ROI is found, the image registration system 10 determines the size of the ROI. There are several possible metrics that can be used to determine the ROI size. The ROI size should be small since a large ROI would result in more floating point operations (floating point multiplies, adds, etc.) and therefore greater computation time. Too small of an ROI, however, may not have enough features to perform an accurate image registration.

Figure 6:
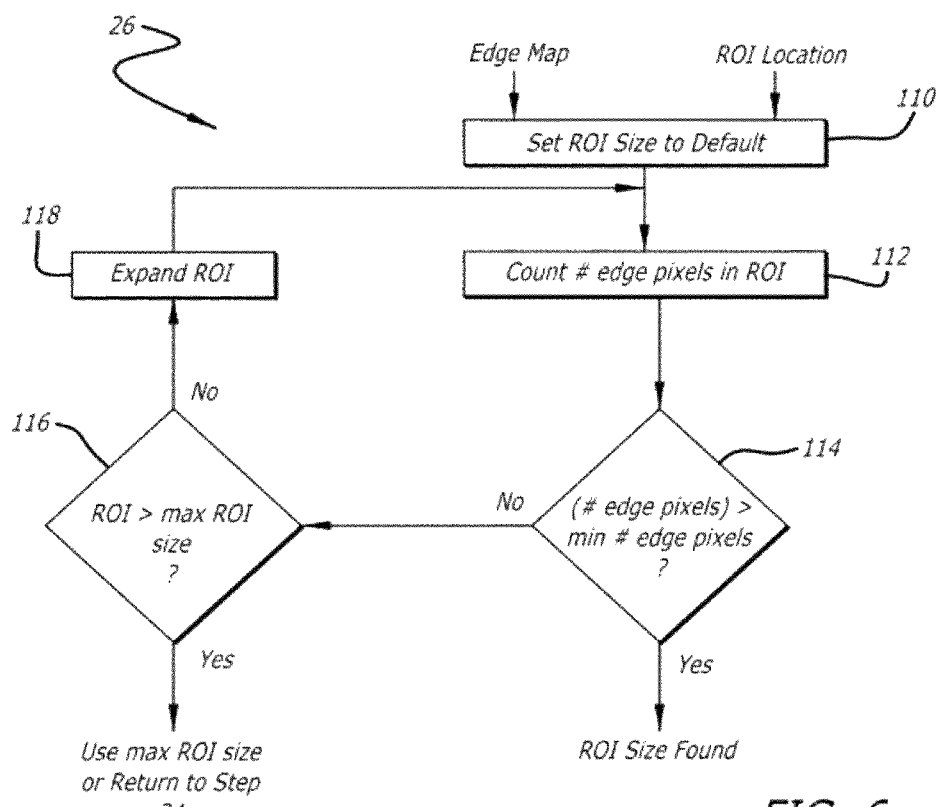
FIG. 6 is a simplified flow diagram of an algorithm for determining the size of the ROI designed in accordance with an illustrative embodiment of the present invention.

FIG. 6 is a simplified flow diagram of an algorithm 26 for determining the size of the ROI designed in accordance with an illustrative embodiment of the present invention. The illustrative algorithm 26 uses the edge map found in Step 22 (shown in FIG. 1) and the ROI location found in Step 24 (shown in FIG. 1) to enlarge the ROI size until it contains enough features to perform an accurate correlation. First, at Step 110, the ROI is set to a default (minimum) size centered over the ROI location (as determined by Step 24). For a 640×240 pixel image, the default ROI size may be set to, for example, a 20×20 pixel square sub-area. Different default sizes and ROI shapes may be used without departing from the scope of the present teachings.

The ROI size is then grown until the number of features contained in the ROI is within an upper and lower bound. At Step 112, count the number of edge pixels contained within the current ROI using the edge map extracted from the first image in Step 22 of FIG. 1. Next, at Step 114, determine if the number of edge pixels is greater than a predetermined minimum number of edge pixels. This lower bound can be an absolute number or a percentage of the total number of pixels in the ROI. The lower bound will vary depending on the application and may be determined empirically. It should be large enough to ensure an accurate image registration, but small enough to reduce computation time as desired.

If the number of edge pixels in the current ROI is greater than the lower bound, then the ROI size has been found. If the ROI does not contain enough edge pixels, then at Step 116, determine if the ROI size is larger than a predetermined maximum ROI size. This upper bound is included to prevent the ROI from growing too large, which may result in unacceptable computation times. If the number of edge pixels in the ROI is greater than the upper bound, then use the maximum ROI size. Alternatively, if the number of edge pixels in the ROI is greater than the upper bound, the algorithm can be adapted to search for a different ROI location (by, for example, adapting the ROI location algorithm 24 of FIG. 4 to find a sub-area containing the next highest number of features).

If at Step 116 the number of edge pixels in the ROI is less than the upper bound then, at Step 118, expand the ROI by, for example, increasing the ROI size by a predetermined number of pixels in each direction. Then repeat the process by returning to Step 112 (counting the number of edge pixels in the new ROI).

Returning to the system block diagram of FIG. 1, after the size and location of the ROI have been found, an ROI is extracted from each input image. At Step 28, apply the ROI size and location to the first image (the original input image, not the edge map) to extract an ROI for the first image. Similarly, at Step 30, apply the ROI size and location to the second image to extract an ROI for the second image. In most applications, the shift between images is relatively small. The same ROI location and size is therefore used for both images.

After the ROIs of the two input images are extracted, the coarse alignment system 40 performs cross-correlation on the ROIs to find a rough approximation of the image shift between the images. First, at Step 46, perform cross-correlation on the ROIs of the two images. The cross-correlation can be computed for all possible shifts (of one image relative to the other image) or, to same computation time, it can be limited to a predetermined number of shifts in each direction. Note that the correlation is performed on the ROIs of the images, not the entire images. This process uses fewer floating point operations compared to full-size image cross-correlation, and therefore reduces the overall computation time of the image registration process.

At Step 48, the shift $(s_x, s_y)$ corresponding to the maximum correlation is selected as the coarse image shift, and at Step 50, the ROIs of the two images are coarsely aligned (i.e., by shifting one of the images relative to the second image by the coarse image shift).

Figure 7:
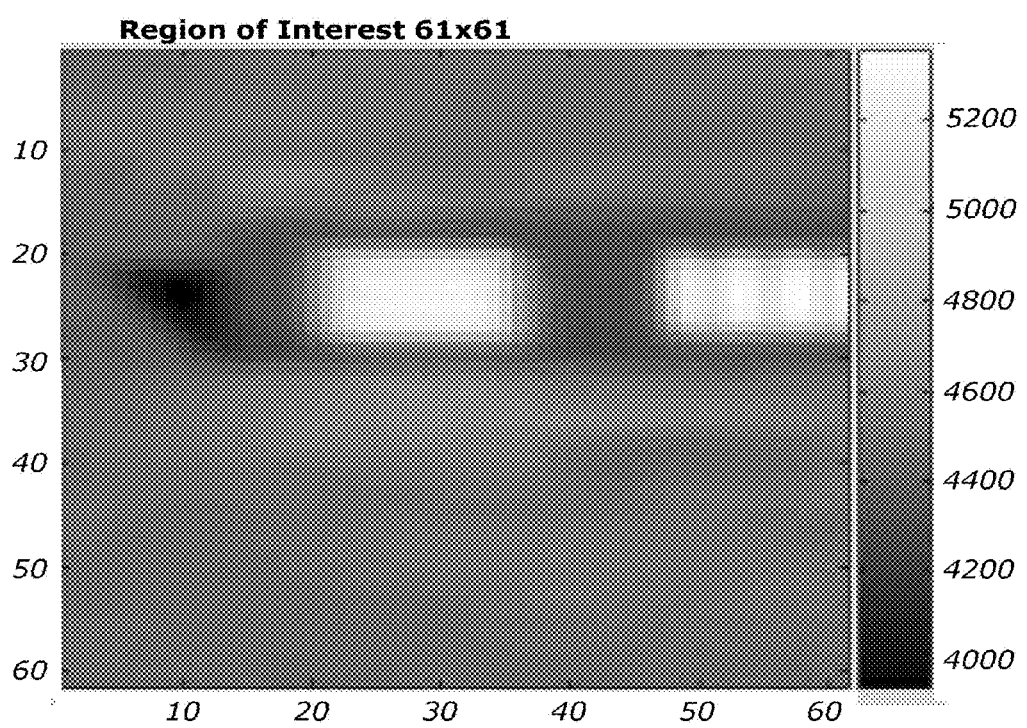
FIG. 7 shows a sample ROI extracted from the image of FIG. 2.
Figure 8:
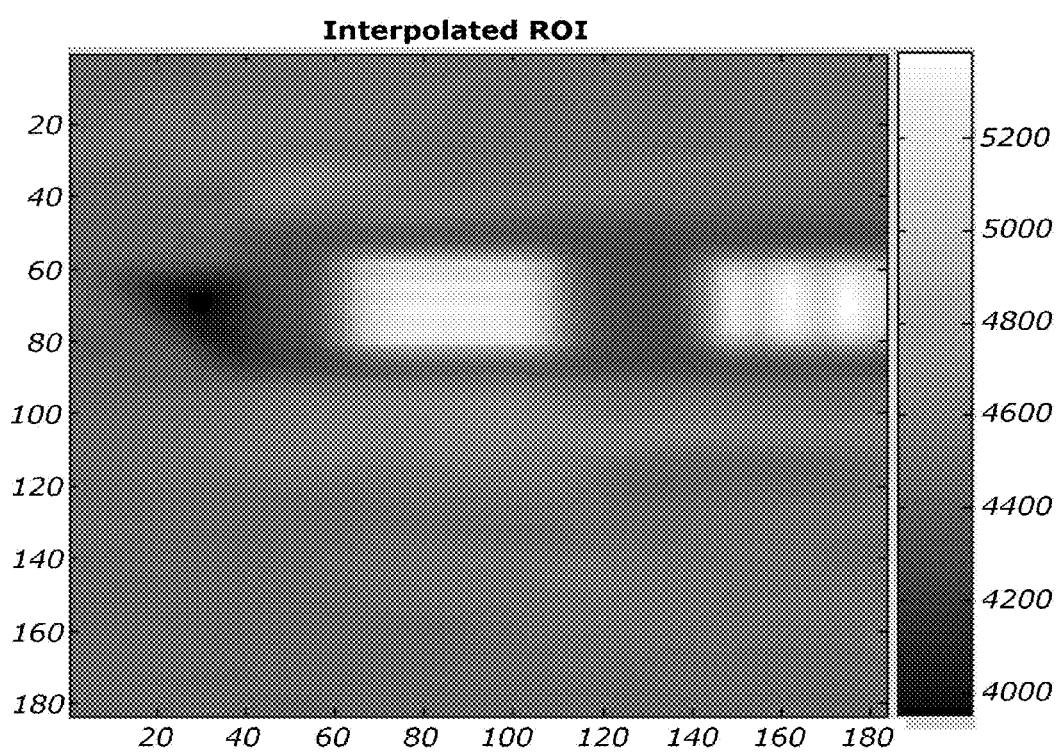
FIG. 8 shows an interpolated version of the ROI of FIG. 7.

After the ROIs are coarsely aligned, the fine alignment system 60 determines the sub-pixel shift between the images. At Step 62, interpolate the ROI of the first image by a predetermined integer N, and at Step 64, interpolate the ROI of the second image by N. If an original ROI size has dimensions R×C, then the interpolated ROI has dimensions NR×NC. The integer N determines the resolution of the sub-pixel image registration. The system is accurate to within 1/N pixels. A larger number N would increase the resolution of the system, but may also increase computation time. In the illustrative embodiment, N is set to three. FIG. 7 shows a sample ROI extracted from the image of FIG. 2, and FIG. 8 shows an interpolated version of the ROT of FIG. 7, with N=3. In the preferred embodiment, a bilinear interpolation algorithm is used for Steps 62 and 64. However, any suitable interpolation algorithm can be used for Steps 62 and 64 without departing from the scope of the present teachings.

Next at Step 66, compute the cross-correlation of the interpolated ROIs. Because the two images are already coarsely aligned to within one (uninterpolated) pixel, the correlation does not need to be computed for all possible shifts. The sub-pixel shift can be determined by computing the correlation for only a few image shifts: N shifts to the right, N shifts to the left, N shifts up, and N shifts down.

At Step 68, the shift $(p_x, p_y)$ corresponding to the maximum correlation is selected as the sub-pixel image shift. The final image shift $(\Delta_x, \Delta_y)$ includes both the coarse and sub-pixel image shifts: $(\Delta_x, \Delta_y)$ $(s_x, s_y)+(p_x, p_y)/N$. At Step 70, apply the coarse and sub-pixel image shifts to the original input images to align the two images (i.e., by shifting one of the images relative to the second image by the final image shift). This step may include interpolating one of the images, shifting, and then downsampling to perform the sub-pixel shift.

The illustrative system described above assumes a translational (shift) difference between the two input images. The system can also be adapted for use with different transformation models. In general, coarse alignment can be performed by applying several different transforms (which may include one type of transform using different transform parameters, or it may include using several different types of transforms) to the ROIs of the input images, computing a correlation metric for each transform, and selecting the transform corresponding with the highest correlation to coarsely align the ROIs of the images. Similarly, fine alignment can be performed by interpolating the ROIs, applying several different transforms to the interpolated ROIs, computing a correlation metric for each transform, and selecting the transform corresponding with the highest correlation as the sub-pixel transform. The coarse alignment transform and sub-pixel transform can then be applied to the original images to align them.

Note that in accordance with the present teachings, correlations are performed on the ROIs of the images, not on the entire images. Image registration systems using cross-correlation typically perform better than gradient-based approaches but are more computationally expensive. By using ROIs, the number of floating-point operations can be reduced dramatically while maintaining accuracy.

The system can also be adapted to find multiple ROIs. The method shown in FIG. 4 can be adapted to find addition ROI locations, or different methods can be used to find each ROI location (for example, finding one ROI location using the method of FIG. 4 and a second ROI location using the fixed location method). The sizes of the ROIs can be determined independently, so the ROIs may have different sizes. The best image shifts (coarse and sub-pixel) can be determined separately for each ROI, and the average shift over all the ROIs can then be used to align the original images.

Image registration using the novel method of the present invention may be much faster than conventional image registration approaches that correlate entire images, especially when the images contain few features. For improved performance, the systems and algorithms described above can be implemented in hardware using, for example, discrete logic circuits, FPGAs, ASICs, etc. Alternatively, the systems and algorithms can be implemented in software, stored in a memory device and executed by a processor. Other implementations may also be used without departing from the scope of the present teachings.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed:

1. A system for finding a region of interest in an image comprising:
   a first system for detecting features in said image;
   a second system for determining a location for said region of interest; and:
   a third system for determining a size of said region of interest based on a number of features contained within a region of said size and at said location in said image, wherein the third system includes a system for enlarging said size until a number of features contained in said region is larger than a predetermined lower bound or until said size is greater than a predetermined upper bound.

2. The system of claim 1 wherein said location is fixed.

3. The system of claim 2 wherein said location is at a center of said image.

4. The system of claim 1 wherein said location is dependent on a number of features contained in said region of interest.

5. The system of claim 4 wherein said second system includes a system for counting a number of features in each row and each column of said image.

6. The system of claim 5 wherein said second system further includes a system for finding a first subset of rows having a large number of features.

7. The system of claim 6 wherein said second system further includes a system for finding a second subset of columns having a large number of features.

8. The system of claim 7 wherein said location is at an intersection of said first and second subsets.

9. A method executed by one or more processors for finding a region of interest in an image including the steps of: detecting features in said image;
   determining a location for said region of interest;
   determining a size of said region of interest based on a number of features contained within a region of said size and at said location in said image; and
   enlarging said size until a number of features contained in said region is larger than a predetermined lower bound or until said size is greater than a predetermined upper bound.

10. The method of claim 9 wherein said location is determined by counting a number of features in each row and each column of said image, finding a first subset of rows having a large number of features and a second subset of columns having a large number of features, and choosing said location at an intersection of said first and second subsets.

11. A method executed by one or more processors for aligning a first image and a second image including the steps detecting features in one of said images;
    determining a location for a region of interest;
    determining a size of said region of interest based on a number of features contained within a region of said size and at said location in said image;
    enlarging said size until a number of features contained in said region is larger than a predetermined lower bound or until said size is greater than a predetermined upper bound;
    applying said size and location to said first and second images to extract a region of interest from each image; and
    cross-correlating said regions of interest using a plurality of transforms to find a first transform that coarsely aligns said regions of interest.

12. The method of claim 11 wherein said method further includes interpolating said regions of interest.

13. The method of claim 12 wherein said method further includes crosscorrelating the interpolated regions of interest using a plurality of transforms to find a second transform that sub-pixel aligns said regions of interest.

14. The method of claim 13 wherein said method further includes applying said first and second transforms to one or both of said first and second images.

* * * * *